United States Patent [19]

Liebenrood et al.

[11] Patent Number: 4,960,989
[45] Date of Patent: Oct. 2, 1990

[54] OPTICAL TIME DOMAIN REFLECTOMETER HAVING A RECEIVER WITH SELECTIVELY CONTROLLED GAIN

[75] Inventors: John D. Liebenrood, Portland, Oreg.; Donald H. McMahon, Carlisle, Mass.

[73] Assignee: Photon Kinetics Inc., Beaverton, Oreg.

[21] Appl. No.: 329,796

[22] Filed: Mar. 28, 1989

[51] Int. Cl.⁵ .............................................. H01J 5/16
[52] U.S. Cl. .............................. 250/227.15; 356/73.1
[58] Field of Search ........................ 250/227, 227.15; 356/73.1

[56] References Cited

U.S. PATENT DOCUMENTS

| | | | |
|---|---|---|---|
| 4,289,398 | 9/1981 | Robichaud | 356/73.1 |
| 4,376,285 | 3/1983 | Leonberger et al. | 357/17 |
| 4,490,709 | 12/1984 | Hammond et al. | 338/15 |
| 4,632,544 | 12/1986 | Form | 356/73.1 |
| 4,685,799 | 8/1987 | Brininstool | 356/73.1 |
| 4,737,026 | 4/1988 | Dalgoutte | 356/73.1 |

OTHER PUBLICATIONS

A. G. Foyt and F. J. Leonberger, "Picosecond Optoelectronic Devices" published by Academic Press, Inc., Ch. 9, InP Optoelectronic Switches, pp. 271–311, (1984).

Primary Examiner—David C. Nelms
Assistant Examiner—Sherrie Hsia
Attorney, Agent, or Firm—Dellett, Smith-Hill and Bedell

[57] ABSTRACT

An optical time domain reflectometer comprises a detector device for detecting optical energy received at an end of a fiber under test, an amplifier having an input terminal connected to the detector device, and a photoconductive switch connected between the amplifier input terminal and a reference potential level. The photoconductive switch is selectively illuminated.

13 Claims, 2 Drawing Sheets

OPTICAL TIME DOMAIN REFLECTOMETER HAVING A RECEIVER WITH SELECTIVELY CONTROLLED GAIN

BACKGROUND OF THE INVENTION

This invention relates to an optical time domain reflectometer having a receiver with selectively controlled gain.

An optical time domain reflectometer (OTDR) is used for testing fiber optic cables. The OTDR comprises a laser diode which is used to introduce pulses of optical energy into an optical fiber at a proximal end of the fiber under test, and a photodiode which generates a current signal that depends on the power with which optical energy is emitted from the fiber at its proximal end in response to the input pulse. It is necessary to convert this current signal to a voltage signal in order to drive a cathode ray tube, which is typically used to provide a display in an OTDR. A transimpedance amplifier may be used to convert a current signal to a voltage signal. However, in a conventional OTDR the current signal is converted to a voltage signal by using the current signal to charge a capacitor that is connected between the input terminal of a voltage amplifier and ground. The resulting voltage signal is proportional to the time integral of the current signal. A series capacitor connected to the output terminal of the amplifier differentiates the voltage signal provided by the amplifier and generates a voltage signal of which the amplitude is proportional to the current signal generated by the photodiode.

Optical energy is emitted from the fiber at its proximal end due to reflections and Rayleigh back-scattering. Reflections occur due to abrupt changes in the refractive index of the medium through which the light pulse is propagating. Typically, such changes occur at connections between lengths of fiber and at breaks in the fiber. Back-scattering occurs due to interaction between the photons of the optical pulses introduced into the fiber and the molecules of the fiber. Back-scattering results in an unavoidable loss in power as an optical pulse travels along the fiber, and therefore the power level of back-scattered light establishes the maximum distance that a pulse can travel along the fiber without suffering an unacceptable loss in power. The power level of back-scattered light also provides diagnostic information, in that it is higher at locations where the fiber is under stress and might therefore be susceptible to damage.

The power level of back-scattered energy is very much lower than the power level of reflected energy. For example, if the duration of the pulse is such as to allow distance resolution by the OTDR of 1 m, the power level of back-scattered energy might be 50 dB below the power level of reflected energy.

When an OTDR is used to observe variation in the power level of back-scattered energy, it is desirable that the back-scattered energy utilize substantially the entire dynamic range of the OTDR. However, because the power level of the back-scattered energy is so low, it is necessary to amplify the signal detected by the photodiode before processing. If a reflection pulse is amplified to the same extent, the amplifier saturates, resulting in distortion of the signal even after the reflection pulse is no longer present. A previous attempt to overcome this problem has involved connecting a Schottky barrier diode between the cathode of the photodiode and ground. A current source that is connected to the Schottky barrier diode is triggered when a reflection pulse is received, and supplies current to the Schottky barrier diode, rendering the Schottky barrier diode conductive so that current provided by the photodiode is shunted to ground rather than being integrated on the capacitor. However, the current source introduces charge into the signal path and limits the accuracy of the measurements that can be made.

It is known to use a photoconductive switch in a high speed sampler. A known type of photoconductive switch comprises a die of InP having two interdigitated electrodes in ohmic contact with its top surface. The switch is turned on by illuminating the top surface of the die. Since holes and electrons are created in pairs, no net charge is generated when the switch is turned on. The ratio between the on resistance and off resistance of a photoconductive switch is typically $10^{-4}$.

U.S. Pat. No. 4,376,285 issued Mar. 8, 1983 (Leonberger et al) discloses a photoconductive switch having interdigitated electrodes. U.S. Pat. No. 4.490,709 issued Dec. 25, 1984 (Hammond et al) also discloses a photoconductive switch.

SUMMARY OF THE INVENTION

A preferred embodiment of the present invention in a first aspect is an optical time domain reflectometer for testing an optical fiber. The reflectometer comprises a detector device for detecting optical energy received at an end of a fiber under test, an amplifier having an input terminal connected to the detector device, a photoconductive switch connected between the amplifier input terminal and a reference potential level, and means for selectively illuminating the photoconductive switch.

A preferred embodiment of the present invention in its second aspect is an optical time domain reflectometer for testing an optical fiber, comprising an electro-optic transducer, means for optically coupling the electro-optic transducer to one end of a fiber under test, for introducing optical energy into the fiber, a first opto-electric transducer, and means for optically coupling the first opto-electric transducer to said one end of the fiber under test, whereby the first opto-electric transducer generates a first electrical signal of which the level depends on the power level at which optical energy is emitted from the fiber under test by way of said one end thereof. An amplifier has an input terminal connected to receive the first electrical signal, and photoconductive switch means are connected between the amplifier input terminal and a reference potential level. A second opto-electric transducer generates a second electrical signal of which the level depends on the power level at which optical energy is emitted from the fiber under test by way of said one end thereof. The photoconductive switch means are illuminated in the event that the level of the second electrical signal exceeds a predetermined threshold level.

A preferred embodiment of the present invention in its third aspect is a method of operating an optical time domain reflectometer, which reflectometer comprises an electro-optic transducer, means for optically coupling the electro-optic transducer to an optical fiber under test, means for energizing the electro-optic transducer for introducing optical energy into the fiber, an opto-electric transducer for detecting optical energy received at one end of the fiber, an amplifier having an input terminal connected to the opto-electric transducer, switch means connected between the amplifier input terminal and a reference potential level and having a high resistance condition and a low resistance condition, and means for selectively placing the switch means in the low resistance condition. The method comprises energizing the electro-optic transducer to introduce a pulse of optical energy into the fiber, examining the level of the electrical signal provided by the amplifier during an interval of a selected duration, commencing at a predetermined time after energizing the electro-optic transducer, and, if the level exceeds a predetermined threshold level, storing information representative of said predetermined time, subsequently energizing the electro-optic transducer to introduce a second pulse of optical energy into the fiber, and placing the switch means in the low resistance condition during an interval of said selected duration commencing at said predetermined time after energizing the electro-optic transducer to introduce the second pulse into the fiber.

BRIEF DESCRIPTION OF THE DRAWINGS

For a better understanding of the invention and to show how the same may be carried into effect, reference will now be made, by way of example, to the accompanying drawings in which.

DETAILED DESCRIPTION

Figure 1:
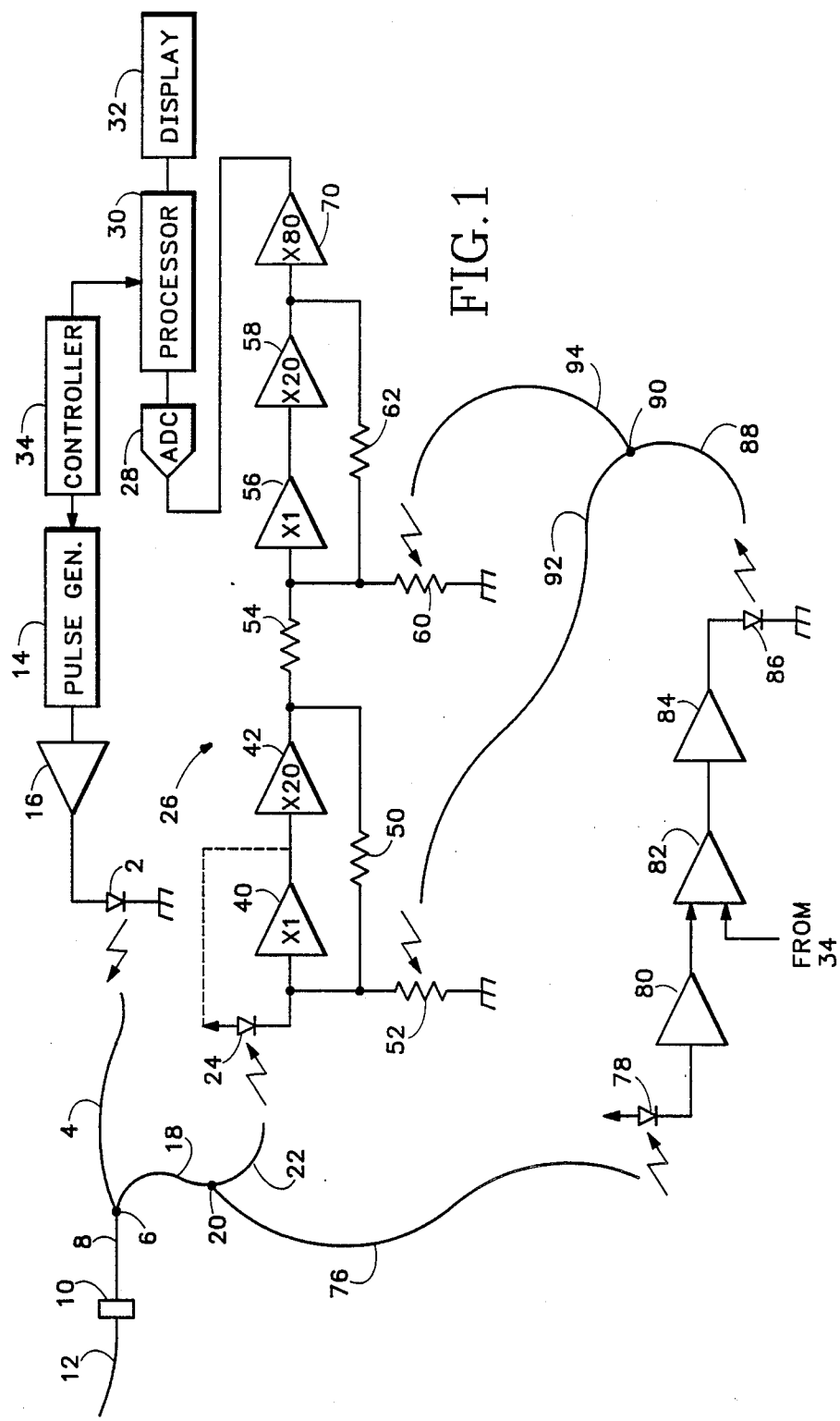
FIG. 1 is a schematic diagram, partly in block form, of an OTDR embodying the invention.

The OTDR shown in FIG. 1 comprises a laser diode 2 which emits light at 1300 nm and is optically coupled through a single mode fiber 4, a directional coupler 6, a second single mode fiber 8 and a front panel connector 10 to a fiber under test 12, which also is a single mode fiber. Electrical pulses are applied to the laser diode 2 by a pulse generator 14 through a laser driver amplifier 16, and cause the laser diode 2 to emit brief pulses of light which are launched into the fiber under test 12. Optical energy that is reflected and back-scattered within the fiber 12 is coupled through the front panel connector 10, the fiber 8, the directional coupler 6, a multimode fiber 18, a directional coupler 20 and a multimode fiber 22 to a receiver photodiode 24. The anode of the photodiode 24 is connected to a positive potential supply and the cathode of the photodiode is connected to the input terminal of an amplification block 26. The amplification block 26 provides an analog output signal which is applied to an analog-to-digital converter (ADC) 28. The ADC 28 provides a digital output signal which may be processed in conventional fashion by a processor 30. For example, the processor may average repeatedly-acquired signals for noise reduction purposes. The processor provides an output signal which is used to provide a display on a display device 32, e.g. a cathode ray tube, of the level of return power as a function of distance. Operation of the reflectometer is controlled by a controller 34.

The amplification block 26 comprises several amplifiers. The first amplifier 40 is a low noise, unity gain transimpedance amplifier whereas the second amplifier 42 has a gain of 20. The noise level generated by the amplifier 42 depends on the output impedance of its source, and accordingly the amplifier 40 is designed to have a high output impedance. The unity gain amplifier therefore serves to isolate the high gain amplifier 42 from the photodiode 24, which has a relatively low output impedance. The higher the input resistance of the amplifier 40, the less noise is contributed by the amplifier 40, and accordingly the greater is its sensitivity. However, the input resistance of the amplifier 40 also determines, in combination with its input capacitance, the response time of the amplifier 40, and consequently the bandwidth of the series connected amplifiers 40 and 42. The higher the input resistance, the smaller the bandwidth. A feedback resistor 50 is connected from the output of the amplifier 42 to the input of the amplifier 40 in order to increase the effective input resistance of the amplifier 40, thus increasing its sensitivity, without reducing the bandwidth of the series connected amplifiers 40 and 42.

A photoconductive switch 52 is connected between the input terminal of the amplifier 40 and ground. The photoconductive switch 52 may be of the known type, comprising interdigitated electrodes in ohmic contact with a body of InP. The spacing between the interdigitated electrodes is about 3 $\mu$m. The ratio of the on resistance of the switch 52 to its off resistance is about $10^4$. The gain of the series connected amplifiers 40 and 42 depends on the resistance of the switch 52. When the switch 52 is on, i.e., conductive, the gain of the amplifier 40 is about $10^{-1.5}$ times its gain when the switch 52 is off, and accordingly the output signal level provided by the series connected amplifiers when the switch 52 is on is about 15 dB below the output signal level provided, for the same input signal level, when the switch is off.

The output terminal of the amplifier 42 is connected through a resistor 54, which converts the voltage signal provided by the series connected amplifiers 40 and 42 to a current signal, to the input terminal of a second unity gain transimpedance amplifier 56, whose output terminal is connected to a second amplifier 58 having a gain of 20. A feedback resistor 62 is connected from the output terminal of the amplifier 58 to the input terminal of the amplifier 56 in order to maintain sensitivity without reducing bandwidth. A second photoconductive switch 60, identical to the switch 52, is connected between the input terminal of the amplifier 56 and ground. The output terminal of the amplifier 58 is connected through a further amplifier 70, having a gain of 80, to the output of the amplification block 26.

The directional coupler 20 applies energy received through the fiber 18 not only to the fiber 22 but also to a second fiber 76. Thus, the coupler 20 divides the return energy received through the fiber 18 into two fractions, one having a power lever that is about 90% of the power level transmitted by the fiber 18 and the other having a power level that is about 10% of the power level transmitted by the fiber 18. The high power fraction is applied to the photodiode 24 by way of the fiber 22, and the low power fraction is applied by way of the fiber 76 to a photodiode 78 having its anode connected to the positive potential supply and its cathode connected to the input terminal of an amplifier 80. The amplifier 80 is a linear/logarithmic amplifier having a linear transfer function at low signal levels and a logarithmic transfer function at higher signal levels, and thus serves to compress the dynamic range of its input signal. The output terminal of the amplifier 80 is connected to one input of a trigger comparator 82, the other input of which receives a trigger level signal from the controller 34. When the output signal provided by the amplifier 80 exceeds the trigger level, the trigger comparator 82 provides an output signal, which is supplied to a laser driver amplifier 84. The laser driver amplifier 84 supplies current to a laser diode 86, which emits light at 830 nm and is optically coupled through a fiber 88, a coupler 90 and fibers 92 and 94 to the two photoconductive switches 52 and 60. The fibers 88, 92 and 94 are multimode fibers, and a light spot about 50 μm across is formed on each photoconductive switch. When the photoconductive switches are illuminated in this fashion, they are turned on.

The fiber 22 is about 2 m longer than the fiber 76, and accordingly the variation in power received by the diode 24 is delayed by about 20 ns with respect to the variation in power received by the diode 78. If the power level of the low power fraction, which is received by the diode 78, is sufficient to cause the photoconductive switches to be turned on, the switches are on by the time that the electrical signal derived from the high power fraction, which is applied to the photodiode 24, reaches the amplifier 40, and accordingly the gain of the series-connected amplifiers 40 and 42 is reduced by a factor of about $10^{1.5}$. The duration of the pulse provided by the diode 86 is sufficient that the second switch 60 is still on by the time that the attenuated signal derived from the high power fraction reaches the amplifiers 56 and 58, and therefore the signal is attenuated still further. It will therefore be seen that by use of the photoconductive switches, high speed gain reduction is accomplished in response to a high return power level, so that the amplifier 70 is not overdriven. The total gain reduction that is achieved is $10^3$. This gain reduction is sufficient to insure that the amplifier 70 will not be overdriven and cause signal distortion.

In FIG. 1, the photodiode 24 is shown as being connected to the positive reference potential level. In this configuration, the capacitance of the photodiode's pn junction limits the bandwidth of the diode. The capacitance of the photodiode 24 can be neutralized by connecting the anode of the photodiode to the output of the amplifier 40, as shown in dashed lines, so that positive feedback is applied to the anode of the photodiode 24.

A current pulse applied to the diode 86 in response to a reflection pulse may be on the order of 100 mA and may cause significant electromagnetic energy to be radiated. The signal current provided by the diode 24 may be on the order of picoamps, and electromagnetic shielding is employed to prevent the electromagnetic energy radiated when the diode 86 is pulsed from being coupled into the signal path between the diode 24 and the amplifier 70.

Use of the light output from a single laser diode to illuminate the two switches 52 and 60 might not result in the switches being illuminated at a sufficient power level to achieve a low on resistance and therefore two laser diodes may be used to illuminate the switches respectively. Parasitic effects arising from use of optical fibers to couple the laser diodes to the respective photoconductive switch may be minimized by integrating each laser diode and its associated photoconductive switch in a single hybrid circuit, with a fiber lens optically coupling the output facet of the laser diode to the photoconductive switch. The photoconductive switch is shielded from the laser diode by an electrically conductive container, and the lens is fitted in a hole in the wall of the container.

Figure 2:
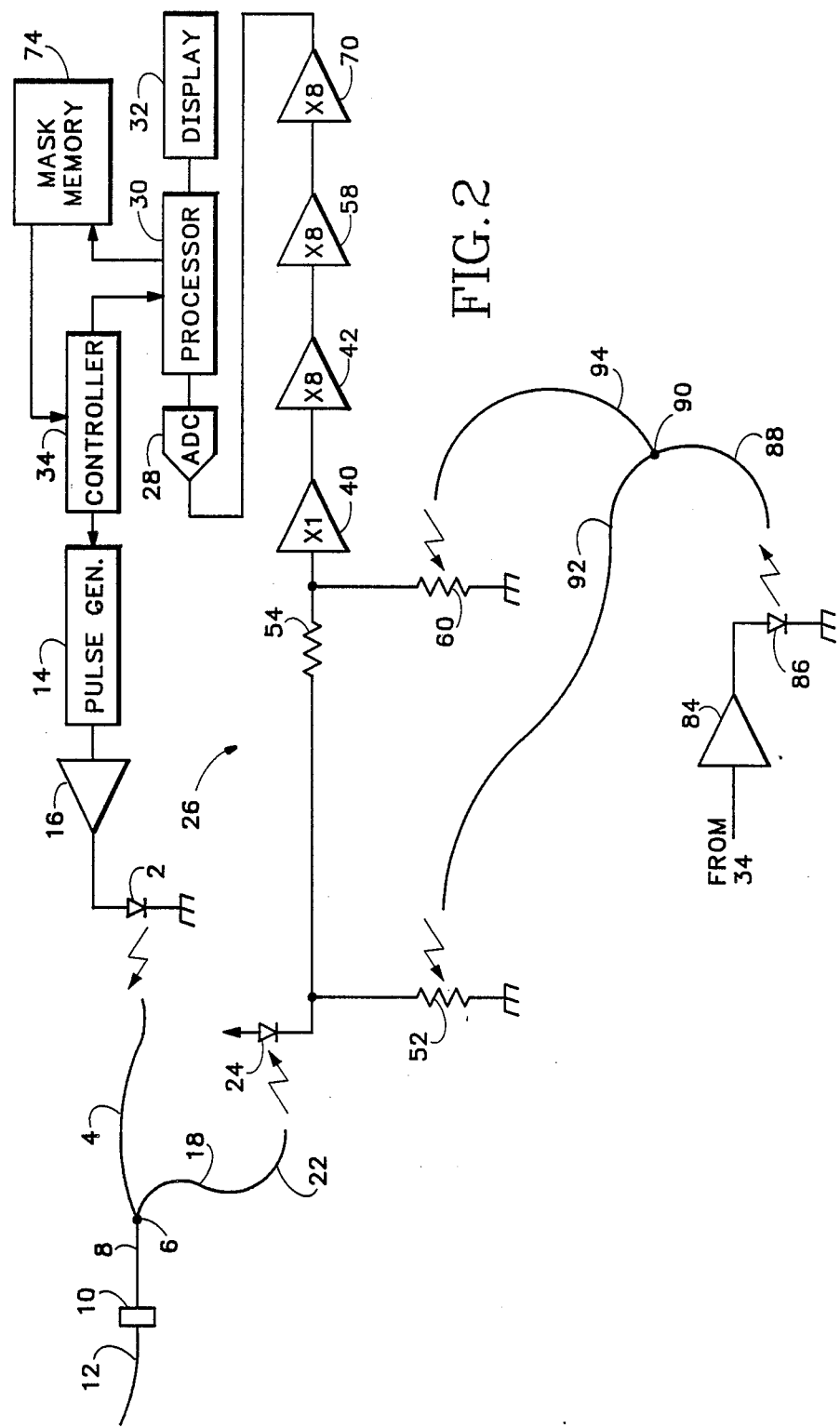
FIG. 2 is a schematic diagram, partly in block form, of part of a second OTDR embodying the invention.

FIG. 2 illustrates a modification of the FIG. 1 OTDR. The FIG. 2 modification is used in order to avoid signal distortion that might arise in the FIG. 1 OTDR due to overdriving of the amplifier 40 or 42. In the case of the FIG. 2 OTDR, the two photoconductive switches are connected as respective legs of a pi attenuator located upstream of the amplifiers with respect to the signal path. The amplifier 40 is a low noise buffer amplifier, and may be a JFET amplifier. The other amplifiers 42, 58 and 70 each have a gain of eight.

In operation of the FIG. 2 OTDR, the laser diode 86 is not driven in direct response to return power received through the fiber 8. During a training phase, information relating to the locations of the reflections is acquired, and during a subsequent measurement phase this information is used to determine when the laser diode 86 should be pulsed. Thus, in the training phase a measurement is made by pulsing the laser diode 2 and examining the output signal of the ADC 28 during intervals at selected delays relative to the pulsing of the laser diode. In the training phase, the laser diode 86 is not pulsed. The processor 30 thereby determines the delay values for which the amplifier 70 is overdriven. These values are stored in a mask memory 74. In the measurement phase, the controller 34 pulses the laser diode 2 and the processor examines the output signal of the ADC 28 at the same delays relative to the pulsing of the laser diode 2, but the controller uses the information stored in the mask memory to pulse the laser diode 86 at the proper times relative to the pulsing of the laser diode 2 to ensure that the photoconductive switches 52 and 60 are on at the times at which the amplifier 70 would be overdriven if the photoconductive switches were off. By turning the photoconductive switches on, the input signal applied to the amplifier 40 is attenuated and overdriving is prevented. A third measurement is carried out in the same way as the second measurement, but without pulsing the laser diode 2, in order to create a signal that represents spurious effects in the signal path from the diode 24 to the ADC 28. The spurious effects that might arise include voltaic signal distortion due to lack of exact symmetry between the populations of negative and positive charge carriers in the photoconductive switches when they are on. The result of the third measurement is subtracted from the result of the second measurement to provide a measurement in which corrections for both overdriving and spurious effects have been made.

It will be appreciated that the present invention is not restricted to the particular embodiments that have been described and illustrated and that variations may be made therein without departing from the scope of the invention as defined in the appended claims and equivalents thereof. For example, although the invention has been described in connection with testing a single mode fiber, the invention is applicable to testing multimode fibers. Thus, the invention is not limited to the propagation modes that have been specified for the various fibers. Further, the invention is not limited to testing with light at any particular wavelength.

We claim:

1. An optical time domain reflectometer for testing an optical fiber, comprising an opto-electric transducer for detecting optical energy received at one end of a fiber under test, an amplifier having an input terminal connected to the opto-electric transducer, photoconductive switch means connected between the amplifier input terminal and a reference potential level, and means for selectively illuminating the photoconductive switch means.

2. A reflectometer according to claim 1, comprising a coupler for dividing the optical energy received at said one end of the fiber under test into a first fraction, which is applied to the opto-electric transducer, and a second fraction, and wherein the means for selectively illuminating the photoconductive switch means comprise a second opto-electric transducer for detecting the second fraction and generating a signal of which the level is representative of the power level of the second fraction.

3. A reflectometer according to claim 2, wherein the means for selectively illuminating the photoconductive switch means further comprise a trigger comparator having a first input terminal connected to the second opto-electric transducer, a second input terminal for receiving a trigger level signal, and an output terminal, and an electro-optic transducer connected to the output terminal of the trigger comparator and operative to emit light when the level of the signal provided by the second opto-electric transducer has a predetermined relationship to the trigger level signal, the electro-optic transducer being optically coupled to the photoconductive switch means.

4. A reflectometer according to claim 1, wherein the opto-electric transducer comprises a photodiode having its cathode connected to the amplifier input terminal and its anode connected to a positive reference potential level.

5. A reflectometer according to claim 1, wherein the opto-electric transducer comprises a photodiode having its cathode connected to the amplifier input terminal and its anode connected to an output terminal of the amplifier.

6. A reflectometer according to claim 1, comprising a second amplifier having an input terminal connected to receive an output signal provided by the first-mentioned amplifier, second photoconductive switch means connected between the second amplifier input terminal and the reference potential level, and means for selectively illuminating the second photoconductive switch means and thereby selectively reducing the gain of the second amplifier.

7. A reflectometer according to claim 1, wherein the photoconductive switch means comprise a pi attenuator.

8. A reflectometer according to claim 7, wherein the pi attenuator comprises a resistor connected between the opto-electric transducer device and the amplifier input terminal, a first photoconductive switch connected between one end of the resistor and the reference potential level, and a second photoconductive switch connected between the opposite end of the resistor and the reference potential level.

9. A reflectometer according to claim 1, wherein the amplifier has an output terminal and the reflectometer further comprises processor means connected to the output terminal of the amplifier for measuring the magnitude of the output signal provided by the amplifier, memory means for storing information relating to the times at which the level of the signal received by the processor means exceeds a predetermined threshold, and control means for using the information stored in the memory means to control operation of the means for selectively illuminating the photoconductive switch means.

10. An optical time domain reflectometer for testing an optical fiber, comprising an electro-optic transducer, means for optically coupling the electro-optic transducer to one end of a fiber under test, for introducing optical energy into the fiber, a first opto-electric transducer, means for optically coupling the first opto-electric transducer to said one end of the fiber under test, whereby the first opto-electric transducer generates a first electrical signal of which the level depends on the power level at which optical energy is emitted from the fiber under test by way of said one end thereof, an amplifier having an input terminal connected to receive the first electrical signal, photoconductive switch means connected between the amplifier input terminal and a reference potential level, a second opto-electric transducer for generating a second electrical signal of which the level depends on the power level at which optical energy is emitted from the fiber under test by way of said one end thereof, and means for illuminating the photoconductive switch means in the event that the level of the second electrical signal exceeds a predetermined threshold level.

11. A reflectometer according to claim 10, wherein the means for illuminating the photoconductive switch means comprise a comparator having a signal input terminal connected to receive the second electrical signal, a reference input terminal for receiving a trigger level signal, and an output terminal, and a second electro-optic transducer which is electrically connected to the output terminal of the comparator and is optically coupled to the photoconductive switch means, the comparator and the second electro-optic transducer being operative to illuminate the photoconductive switch means when the level of the second electrical signal exceeds the level of the trigger level signal.

12. A method of operating an optical time domain reflectometer, which reflectometer comprises an electro-optic transducer, means for optically coupling the electro-optic transducer to an optical fiber under test, means for energizing the electro-optic transducer for introducing optical energy into the fiber, an opto-electric transducer for detecting optical energy received at one end of the fiber, an amplifier having an input terminal connected to the opto-electric transducer, switch means connected between the amplifier input terminal and a reference potential level and having a high resistance condition and a low resistance condition, and means for selectively placing the switch means in the low resistance condition, said method comprising:
  energizing the electro-optic transducer to introduce a pulse of optical energy into the fiber,
  examining the level of the electrical signal provided by the amplifier during an interval of a selected duration, commencing at a predetermined time after energizing the electro-optic transducer, and, if the level exceeds a predetermined threshold level,
  storing information representative of said predetermined time,
  subsequently energizing the electro-optic transducer to introduce a second pulse of optical energy into the fiber, and
  placing the switch means in the low resistance condition during an interval of said selected duration commencing at said predetermined time after energizing the electro-optic transducer to introduce the second pulse of optical energy into the fiber.

13. A method according to claim 12, wherein the switch means comprise a photoconductive member and the step of placing the switch means in the low resistance condition comprises illuminating the photoconductive member.

* * * * *